J. G. HILTON.
AIR CUSHION.
APPLICATION FILED AUG. 1, 1910.
984,220.
Patented Feb. 14, 1911.
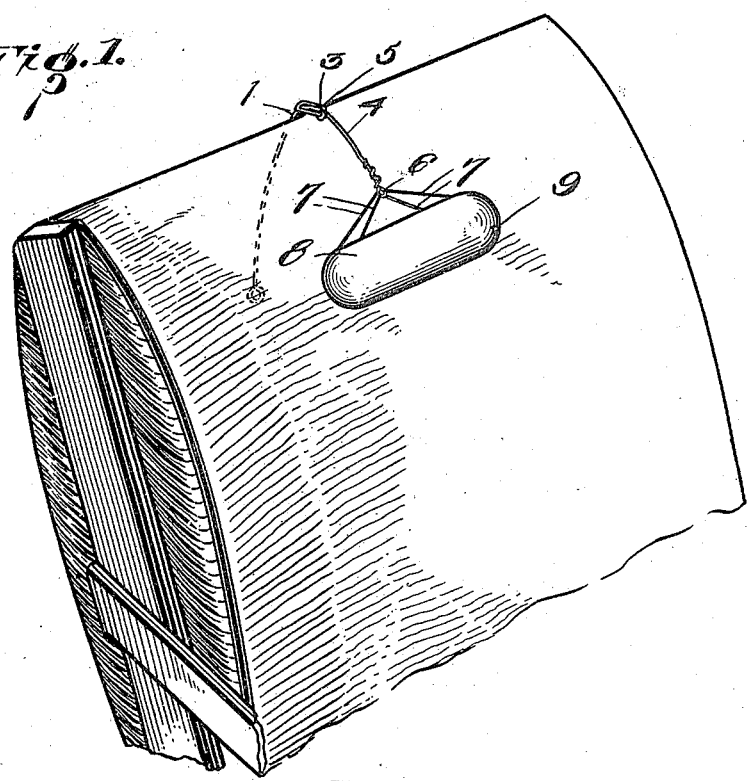
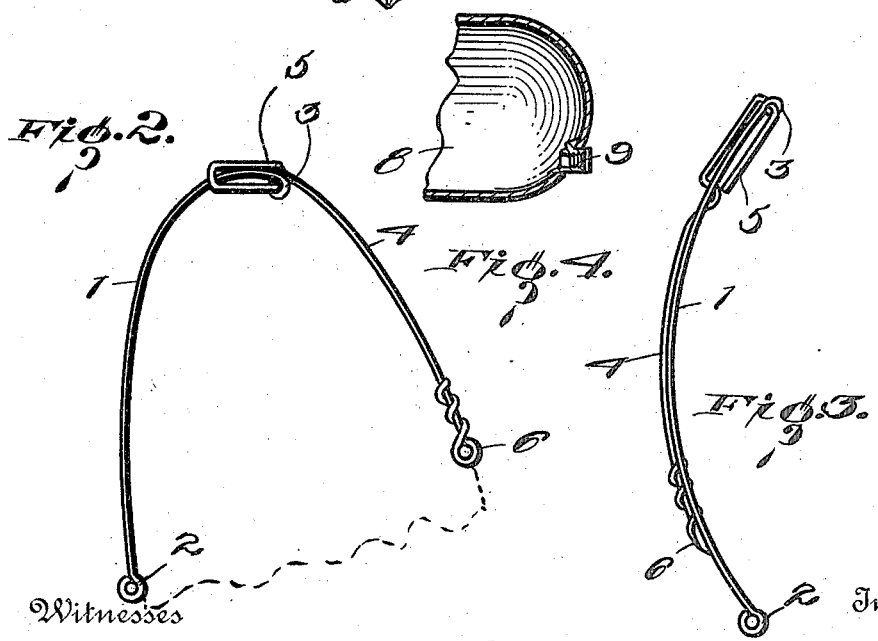
Witnesses
Inventor
Jesse G. Hilton.
By E. E. Vrooman, Attorney.

UNITED STATES PATENT OFFICE.

JESSE G. HILTON, OF PRESCOTT, ARKANSAS.

AIR-CUSHION.

984,220.

Specification of Letters Patent.  Patented Feb. 14, 1911.

Application filed August 1, 1910. Serial No. 574,836.

*To all whom it may concern:*

Be it known that I, JESSE G. HILTON, a citizen of the United States of America, residing at Prescott, in the county of Nevada and State of Arkansas, have invented certain new and useful Improvements in Air-Cushions, of which the following is a specification, reference being had therein to the accompanying drawing.

This invention relates to head rests especially adapted for use in connection with seats of railroad cars, and the principal object of the same is to provide a head rest and hanger therefor that can be readily folded into small compass when not in use so that but the minimum of storage space is required.

With the above generally stated object in view, the invention contemplates a resilient hanger made in two sections for hooking over the upper edge of a car seat, the free end of one section engaging an inflatable cushion to hold said cushion in position for the head of the occupant of the seat.

In the practical application of the invention it will be understood, of course, that the essential features thereof are necessarily susceptible of changes in details and structural arrangements, one preferred and practical embodiment of which is shown in the accompanying drawings, wherein:—

Figure 1 is a fragmentary perspective view of a car seat showing the improved head rest applied thereto. Fig. 2 is a side view of the hanger for the head rest as it appears in use. Fig. 3 is a similar view showing the hanger folded. Fig. 4 is a fragmentary sectional view of the head rest.

Referring to the accompanying drawings by numerals, it will be seen that the improved head rest comprises a hanger that is formed of two lengths of resilient rod metal, the member designated by the numeral 1 being curved to conform to the contour of the upper edge and rear portion of the back of a car seat. The lower end of said member 1 being rolled as indicated at 2 to present a round surface to the car seat so that it will not damage the back of said seat. The upper end of said member 1 overhangs the upper edge of the car seat back and is provided with an eye 3 that is on an incline relative to said member 1. The other member 4 hangs over the front surface of the back of the seat and has an elongated loop 5 formed in its upper end which is slidably engaged by the eye 3 of member 1. The lower end of member 4 is twisted to form an eye 6 with which the suspending cords 7 that project from an inflatable air cushion 8 engage. Said air cushion is provided with the usual inflating nipple 9.

When in use, the end eye 3 of member 1 while engaged with one side of the loop 5, will bind thereon when members 1 and 4 are relatively spread, but as said members are formed of resilient material, they can be readily sprung over the upper edge of a car seat back. When in such position, they clamp said back, so that the cushion 8 will be held in proper position. When removed, the members can be folded together as shown in Fig. 3, and the air permitted to escape from the cushion. Said cushion is preferably of rubber or rubber composition, so that it can be compactly folded.

What I claim as my invention is:—

An attachment for head rests comprising two sections of resilient material constructed of different lengths and both having curved body portions, the shorter section having on one end an eye, its other end being bent to provide an elongated rectangular-shaped loop, the longer section having eyes at opposite ends, one of said eyes being inserted over one bar of the loop so as to have longitudinal movement over the entire loop and also form a hinge joint therewith, and said sections adapted to be folded so as to contact with each other when not in use, substantially as described.

In testimony whereof I hereunto affix my signature in presence of two witnesses.

JESSE G. HILTON.

Witnesses:
 JIM MITCHELL,
 J. H. BARNES.